(12) United States Patent
Lottin et al.

(10) Patent No.: US 8,238,947 B2
(45) Date of Patent: Aug. 7, 2012

(54) METHOD AND INSTALLATION FOR TRANSMITTING A MESSAGE WITH PREDETERMINED DURATION OF VALIDITY ADDRESSED TO A SUBSCRIBER TERMINAL

(75) Inventors: Philippe Lottin, Trebeurden (FR); Jean-Michel Ortholand, Saint-Paul-de-Varces (FR); Thierry Bonnefoy, Meylan (FR)

(73) Assignee: France Telecom, Paris (FR)

( * ) Notice: Subject to any disclaimer, the term of this patent is extended or adjusted under 35 U.S.C. 154(b) by 882 days.

(21) Appl. No.: 11/597,691

(22) PCT Filed: May 27, 2004

(86) PCT No.: PCT/FR2004/001320
§ 371 (c)(1),
(2), (4) Date: Nov. 13, 2007

(87) PCT Pub. No.: WO2006/005814
PCT Pub. Date: Jan. 19, 2006

(65) Prior Publication Data
US 2009/0042588 A1      Feb. 12, 2009

(51) Int. Cl.
*H04W 4/00* (2009.01)
*H04M 1/725* (2006.01)
(52) U.S. Cl. .................................. 455/466; 455/412.1
(58) Field of Classification Search .................. 455/466, 455/412.1
See application file for complete search history.

(56) References Cited

U.S. PATENT DOCUMENTS

| | | | | |
|---|---|---|---|---|
| 5,966,663 | A * | 10/1999 | Gleason | 455/466 |
| 2003/0050080 | A1* | 3/2003 | Uchimura | 455/466 |
| 2003/0100292 | A1 | 5/2003 | Kynast et al. | |
| 2004/0048627 | A1* | 3/2004 | Olvera-Hernandez | 455/466 |
| 2005/0148350 | A1* | 7/2005 | Kamphuis | 455/466 |

FOREIGN PATENT DOCUMENTS

| | | |
|---|---|---|
| GB | 2 383 494 A | 6/2003 |
| WO | WO 02/09460 A1 | 1/2002 |

OTHER PUBLICATIONS

"Global System for Mobile Communications Digital Cellular Telecommunications System (Phase 2+); Technical Realization of the Short Message Service (SMS); Point-to-Point (PP) (GSM 03.40 version 5.5.1)"; ETS 300 901: ETSI, European Telecommunications Standards Institute, Sophia-Antipolis, FR, vol. SMG4, no. Second Edition, Sep. 1997, pp. 1-110; XP014014676 ISSN: 0000-0001.

* cited by examiner

*Primary Examiner* — Steven Lim
*Assistant Examiner* — Daniel Lai
(74) *Attorney, Agent, or Firm* — McKenna Long & Aldridge LLP

(57) ABSTRACT

Method of transmitting a message with duration of validity destined for a subscriber terminal, comprising the formulating, in the message, of a field containing information regarding duration of validity of the message and the monitoring of the validity of the message on the basis of the information contained in said field, wherein the message is transmitted to the terminal of the subscriber and, on the expiry of the duration of validity of the message, the message received by the terminal is modified or deleted in such a way as to prevent consultation thereof.

14 Claims, 4 Drawing Sheets

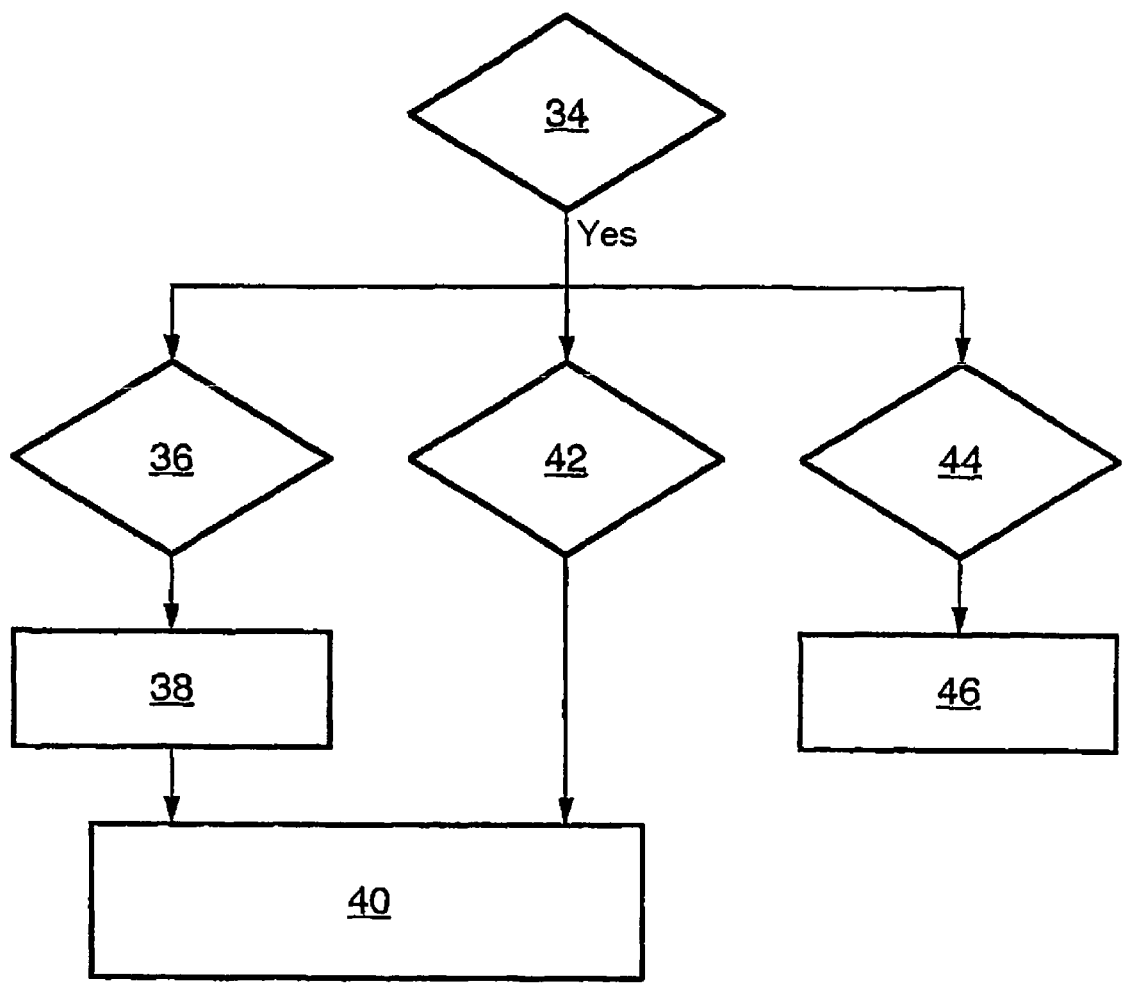

METHOD AND INSTALLATION FOR TRANSMITTING A MESSAGE WITH PREDETERMINED DURATION OF VALIDITY ADDRESSED TO A SUBSCRIBER TERMINAL

This application claims priority from PCT/FR2004/001320, filed May 27, 2004, which is hereby incorporated by reference in its entirety.

The invention relates to messaging services and relates, more particularly, to the transmission of messages with duration of validity, that is to say that are consultable only for a predefined period of validity. One of the applications of the invention relates to the transmission of ephemeral SMS ("Short Messages Services") short messages.

BACKGROUND OF THE INVENTION

Specifically, certain telecommunication operators offer, in addition to telecommunication services proper, additional services. In the case of a short message service, these additional services are hosted in servers of messaging services which communicate with the short message server or servers so as to render the services offered.

Furthermore, upon the implementation of a short message service, which consists in transmitting a short message from a sender terminal to an addressee terminal, the message travels via the short message server and remains stored there for as long as the addressee terminal has not received it. This storage may result either from the fact that the transmission of the message to the addressee occurs on each connection of the terminal or from a failure of the transmission, when the transmission of the message occurs automatically, immediately upon receipt of the message by the server.

There is provision for the messages to contain a field, entitled "validity period" or "VP" which is used to define a maximum duration for which the message may be stored in the server. Thus, on expiry of this period of validity, if it has not been possible to transmit the short message to its addressee, it is deleted and the transmission attempts are stopped. Conversely, when a message is transmitted to its addressee, the message is destroyed either after explicit deletion by the user, or automatically after reading of the message, this being the case, for example, for welcome messages addressed to users by operators on a trip abroad. On the other hand, no provision is made to assign a duration of validity to the message after its receipt so as to prevent consultation thereof on expiry of the duration of validity. Hence, no provision is made to allow the use of a message, that is to say to read it, to reply to it, to record data stored therein, etc., for a limited period of time.

SUMMARY OF THE INVENTION

The aim of the invention is to alleviate this drawback.

The subject of the invention is therefore a method of transmitting a message with duration of validity destined for a subscriber terminal, comprising the formulation, in the message, of a field containing information regarding duration of validity of the message and the monitoring of the validity of the message on the basis of the information contained in this field.

Furthermore, according to this method, the message is transmitted to the terminal of the subscriber and, on the expiry of the duration of validity of the message, the message received by the terminal is modified or deleted in such a way as to prevent consultation thereof.

Thereupon it becomes possible to monitor the validity of the message after its transmission to the remote terminal.

In a mode of implementation of this method, duration of validity information is transmitted to the terminal jointly with the message and the duration of storage of the message in the terminal is managed, within the terminal, so as to permit the consultation of the message so long as the duration has not elapsed. Thus, according to this mode of implementation, the counting down of the duration of validity is performed locally within the terminal. The countdown time is not calculated from the transmission of the message from the short message server to the addressee but from the receipt of this message by the remote terminal.

In this mode of implementation, the terminal detects information regarding duration of validity in the message, it causes the generation of an acoustic symbol or of a visible signal for the duration of validity of the message so as to indicate the possibility of consulting the message.

The message may furthermore comprise a field for storing a text intended to be displayed in place of the message on the expiry of the duration of validity. In this mode of implementation, on expiry of the duration of validity, the message is replaced with a predetermined text conveyed by the message itself.

It is moreover possible to integrate with the message a field for programming the behavior of the terminal, vis-à-vis the message on expiry of the duration of validity, so as to define a mode of modification or of deletion of the message.

Finally, it is possible to integrate with the message a data field containing parameterization codes for the terminal.

According to another characteristic of the invention, in the course of the management of the duration of validity, the duration of validity stored in the field of the message is updated at each clock cycle of the terminal. Thus, by virtue of the updating of the value of duration of validity stored in the message itself, the possibility of managing the duration of validity of the message is retained even after transfer of the message from the addressee terminal to another terminal.

Preferably, the instant of the last update of the duration of validity is moreover stored, and said duration of validity is updated each time the terminal is switched on. It is thus possible to take account of the periods for which the terminal is off.

In another mode of implementation, the message is modified or deleted in such a way as to prevent consultation thereof after each shutdown of the terminal or upon each change of time of the terminal.

According to yet another mode of implementation, the duration of validity of the message is managed within a server of messaging services which causes, on the expiry of the duration of validity, the transmission to the terminal of a message replacing the message with limited duration.

According to this mode of implementation, it is possible to manage the duration of validity of a message even when the addressee terminal is not a terminal specifically provided for this service.

It is possible to store in memory in a messaging services server, information identifying the type of terminal to which the terminal of the user belongs so as to identify, as a function of the type of terminal, the mode of modification or of deletion of the message to be used from among a first mode according to which the duration of validity of the message is managed within the terminal and the message is deleted or modified by the terminal and a second mode according to which the duration of validity is managed within the messaging service server and the message is deleted by dispatching the replacement message.

The subject of the invention is also an installation for transmitting a short message destined for a subscriber terminal, for the implementation of a method as defined above, characterized in that it comprises a server of short messages, means for inserting, into the message, a field containing information regarding duration of validity of the message, and means for monitoring the validity of the message and for modifying or deleting the message in such a way as to prevent consultation thereof on the expiry of the duration of validity of the message.

In various embodiments, the means for monitoring the duration of validity of the message may be hosted in the addressee terminal for which the message is destined or be hosted in a server of messaging services which causes, on the expiry of the duration of validity, the transmission to the terminal of a message replacing the message with limited duration.

BRIEF DESCRIPTION OF THE DRAWINGS

Other aims, characteristics and advantages of the invention will become apparent on reading the following description given merely by way of nonlimiting example, and offered with reference to the appended drawings in which:

FIG. 4 is a flowchart illustrating the phase of updating of the duration of validity of the message when the terminal is switched on;

FIG. 6 is a flowchart illustrating the management of the mode of behavior of the terminal vis-à-vis the message on the expiry of the duration of validity.

DESCRIPTION OF PREFERRED EMBODIMENTS

A first exemplary implementation of a service for transmitting messages with duration of validity in accordance with the invention will firstly be described with reference to FIG. 1. This mode of implementation consists in transmitting an ephemeral SMS short message from a server of short message services, passing through a transmission gateway consisting of a short message server. It is appreciated however that the invention applies equally to the transmission of any type of ephemeral messages and to a mode of implementation according to which the content transmitted is transmitted directly between subscriber terminals.

Figure 1:
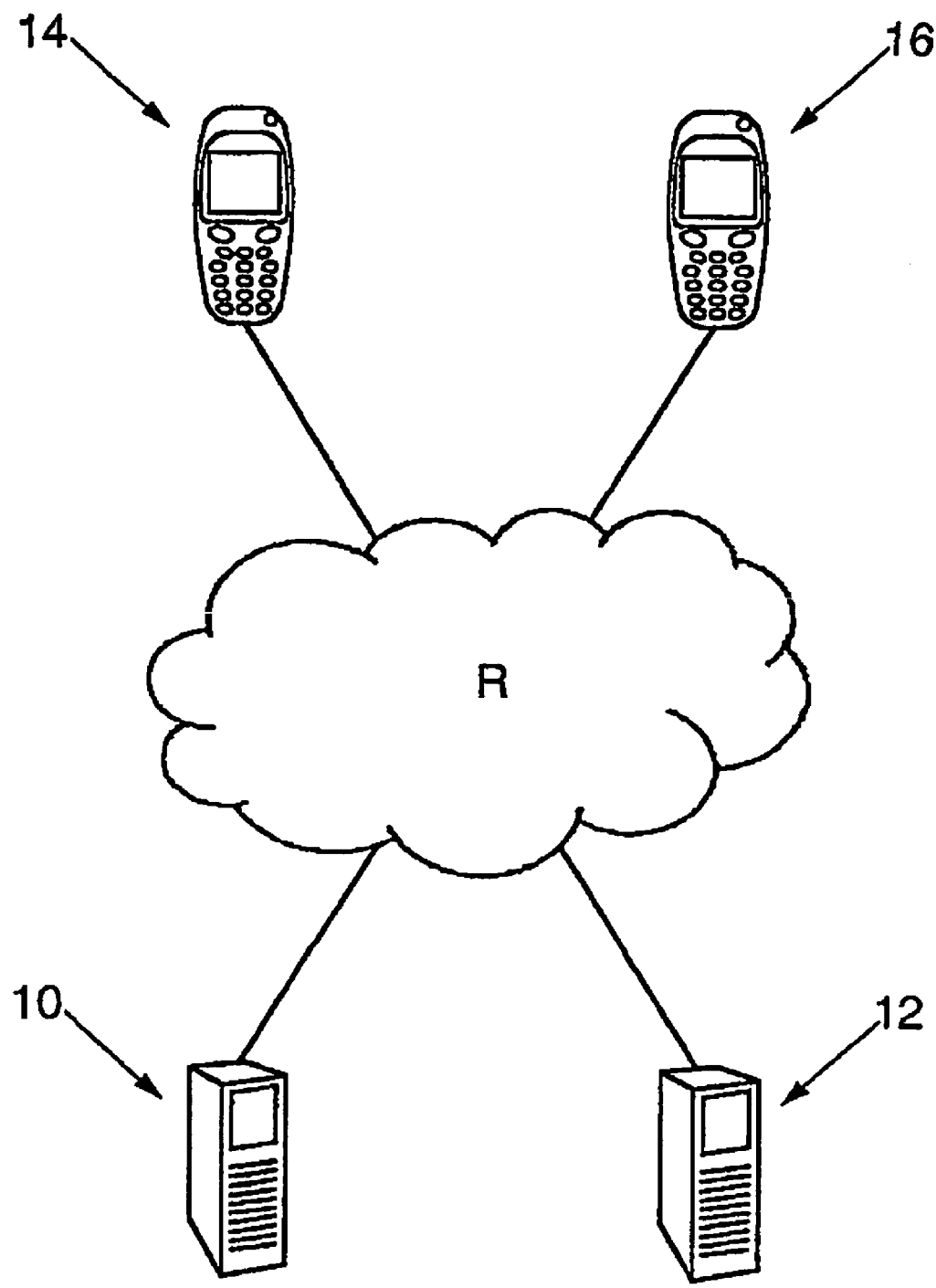
FIG. 1 is a schematic diagram illustrating the general architecture of an exemplary implementation of a telecommunication network supporting a method for transmitting a short message in accordance with the invention.

In the exemplary implementation represented in FIG. 1, the telecommunication service according to the invention is set up in a telecommunication network R comprising a short message server 10 and a messaging services server 12 which communicates with the short message service 10.

As is known per se, the short message server 10 is intended to manage the dispatching of SMS short messages between a first terminal 14 and a second terminal 16. Although the terminals 14 and 16 visible in FIG. 1 consist of portable telephone sets, the invention applies equally, in a general manner, to the transmission of short messages between all types of telephony or computer terminals capable of sending and receiving short messages such as these.

Furthermore, in the exemplary embodiment visible in FIG. 1, the network is provided with a single messaging server 10 which takes charge of the receipt of a message originating from one of the terminals and the retransmission of this message to the addressee terminal. However, the invention applies equally to networks in which the reception and the transmission of the messages are performed by respective servers.

According to a first variant implementation of the invention, in addition to the reception and dispatching of the messages, the server 10 is also in charge of managing the duration of validity of the messages after transmission to the addressee. More particularly, this management, which is performed within the server 10, can consist in monitoring a predetermined duration of validity starting from the instant at which the message was dispatched from the server 10 to its addressee or starting from the instant at which the addressee dispatched an acknowledgment of receipt in such a way as to count down the duration starting from an instant which corresponds substantially to the receipt of the message by the addressee.

This mode of implementation does not require the provision of specific terminals. Its implementation involves the insertion, by the messaging services server 12, of one or more fields into the message. This or these fields are formulated on the basis of information provided by the sender or automatically, and contain data relating to the duration of validity of the message, that is to say information making it possible to identify that the message is an ephemeral message and information regarding the duration for which this message can be consulted by the addressee.

The server 10 recovers this value and monitors the duration of validity by counting it down. As soon as this duration has elapsed the message is deleted by dispatching, to the addressee, a second message, using a function for replacing short messages.

This function for replacing short messages (or "replace short message") is a function available and provided for in the ETSI TS 123 040 V5.5.1 technical specification which describes the technical realization of short message services.

Thus, on expiry of the duration of validity, the first message is replaced with the second and is no longer consultable.

According to a second variant implementation of the invention, the management of the duration of validity is performed within the addressee terminal, for example the terminal designated by the general numerical reference 16.

As previously, this mode of implementation also requires the insertion, by the messaging services server 12, of a field into the message, which contains information making it possible to indicate that the message is a message with limited or unlimited duration of validity and a duration of life of the message. This information is retransmitted by the service server 10 to the terminal 16, jointly with the message. Said information may, however, be conveyed using two respective fields.

Several fields are in fact provided in the message for conveying the information necessary for the implementation of this service.

Thus, for example, as indicated previously, there is provided a first field for storing the duration of validity of the message on the remote terminal. This duration of life is for example defined in seconds. If no value is fixed, or if the value is zero, the short message is then considered to be of unlimited duration of validity.

The message also comprises a field for storing a start-of-life message, intended to be displayed on the terminal upon receipt of the message and up to the expiry of the duration of validity so as to indicate to the addressee the possibility of consulting the message. Such a message may be made up of any type of visible symbol, such as an icon, or acoustic symbol, making it possible to signal the receipt of a message with limited duration of validity. This message is displayed for the whole of the duration of validity. Simultaneously with this message, the duration of validity may also be presented.

There is also provided an optional field for storing a text or, in a general manner, an end-of-life visual or acoustic content intended to be displayed on expiry of the duration of validity, in place of the initial text.

A programming field is provided for programming various behaviors of the terminal vis-à-vis the short message. These behaviors, on the expiry of the duration of validity are, for example, programmed by the following values of this field:

00: this programming corresponds to a mode of implementation according to which the end-of-life text is conveyed by the message or, by default, a standard message, replaces the initial text on the expiry of the duration of validity. No reply to this message is possible. The field entitled "reply path" described in the aforesaid technical specification is then forced to 0;

01: according to this mode of programming, on the expiry of the duration of validity, the end-of-life text or, by default, a standard message replaces the initial text. On the other hand, no modification of the capacity to reply to the message is performed; and 10: this mode of programming corresponds to a deletion of the message.

Finally, an optional data field is provided so as, for example, to configure the terminal. This field is intended to convey data processed locally by the terminal throughout the whole duration of validity of the message. For example, configuration data for the terminal, data of images, of sound, etc. may be transmitted to the addressee terminal.

In the case where the initial text is replaced with an end-of-life message, the initial text is rendered totally inaccessible. On the other hand, the replacement text is considered to be a text with unlimited duration.

To convey the information contained in the aforesaid fields, it will be possible to use bytes available in the SMS data frames. For example, it will be possible to use the bytes A0-BF of the field entitled "Information Element Identifier", of the "TP-User data" field described in the ETSI TS 123 040 V5.5.1 technical specification mentioned above.

As is appreciated, the service should not be disturbed by the on or off state of the addressee terminal. The putting in place of diverse processes as a function of the on or off state of the terminal is therefore effected.

Figure 2:
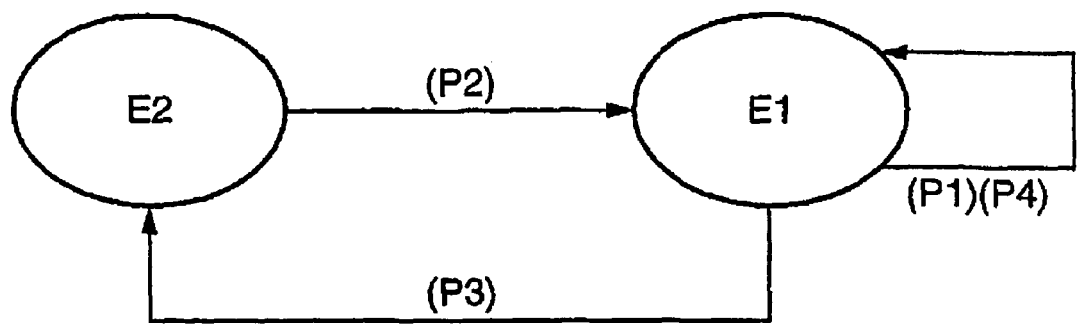
FIG. 2 is a diagram illustrating the mode of implementation of the method of the invention as a function of the state of the terminal.
Figure 3:
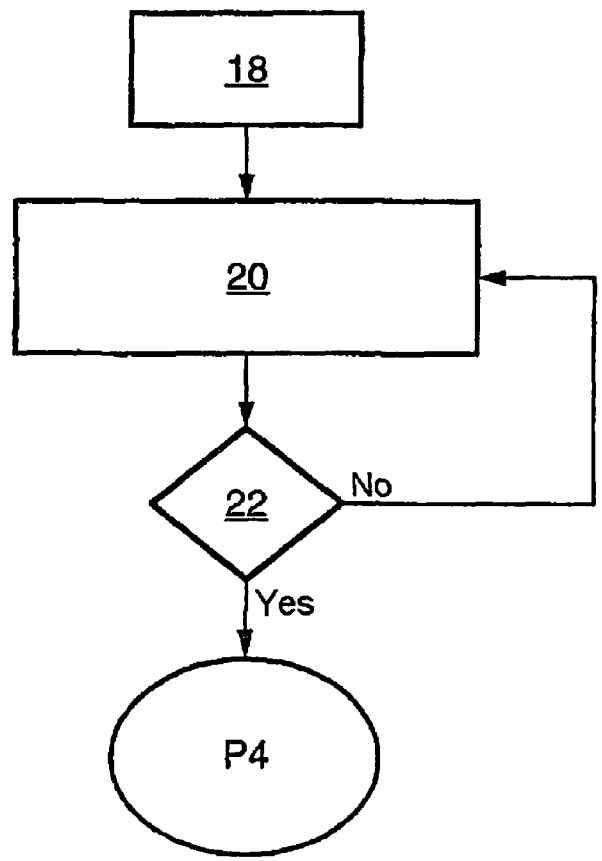
FIG. 3 is a flowchart illustrating the phase of updating of the duration of validity of the message.

As is seen in FIG. 2, there are provided four modes of implementation to take account of the on state (E1) or off state (E2). Four processes are distinguished, namely:

process P1: this algorithm corresponds to an on state of the terminal;
process P2: this algorithm corresponds to a switch from the off state E2 to the on state E1,
process P3: this algorithm corresponds to the switch from the on state E1 to the off state E2; and
process P4: this algorithm corresponds to a processing of a short message whose duration of validity has elapsed when the terminal is in the on state E1.

According to these various processes, the terminal effects, locally, management of the duration of validity of the message by modifying, at each clock cycle of the terminal, the value stored in the corresponding field.

Thus, as far as the process P1 is concerned, when the terminal is in the on state E1, and when an SMS short message with duration of validity is present in the addressee's inbox (step 18) at each clock cycle, the duration of validity of the message is decremented by a duration corresponding to a cycle period (step 20). In the course of this step, the duration d of validity stored in the message is updated using the following relation:

$$d = d - n \times t$$

in which n designates the number of cycles elapsed and t designates the period of a cycle.

In the course of this period a time-stamping of the update is also effected by storing the instant D of the update, doing so in order to manage the periods in which the terminal is off. This storage may be performed either locally in the terminal, for example in a table associating a date D with each message identifier with duration of validity, or be provided as an additional field at the message level.

During the following step 22, also implemented at each cycle of the message, a test is performed so as to determine whether the duration d of validity is less than or equal to 0. If such is not the case, the process returns to the previous step 20. If such is the case, the process continues with the process P4, which will be described subsequently.

Figure 4:
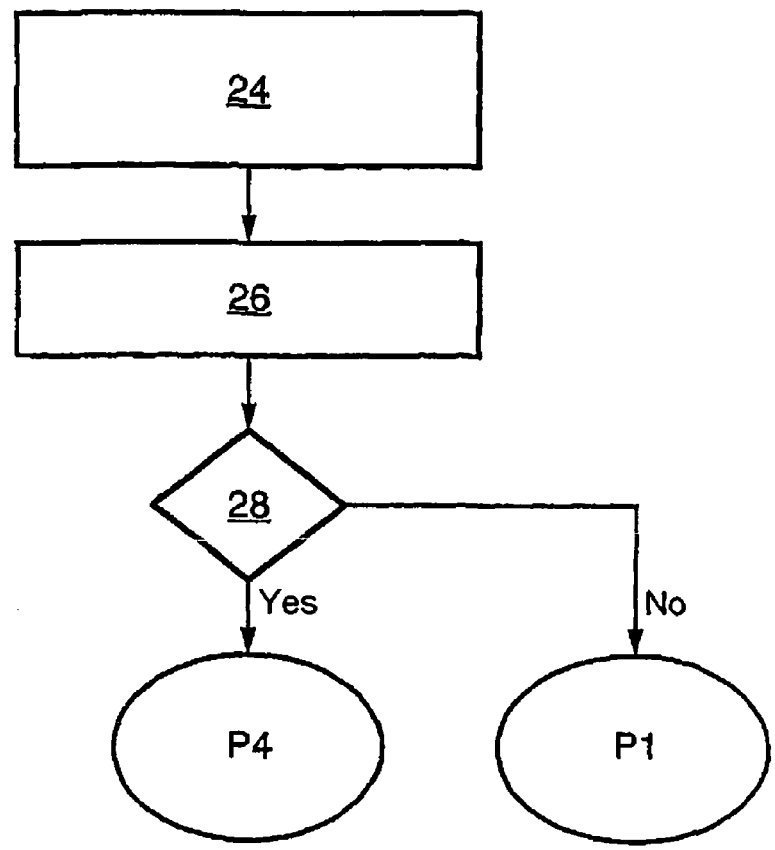

Referring to FIG. 4, each time the terminal is started up (process P2), the terminal scans the inbox in such a way as to detect the presence of an SMS with duration of validity and for which the date of update D has been stored (step 24). An update of the value of D is then effected with the aid of the following relation:

$$d = d - (d' - D)$$

in which d' designates the current date (step 26).

As previously, a test of the duration of validity d is then effected during the following step 28. In the case where this duration is negative, the process continues with the process P4. In the converse case, the process P1 is implemented.

Figure 5:
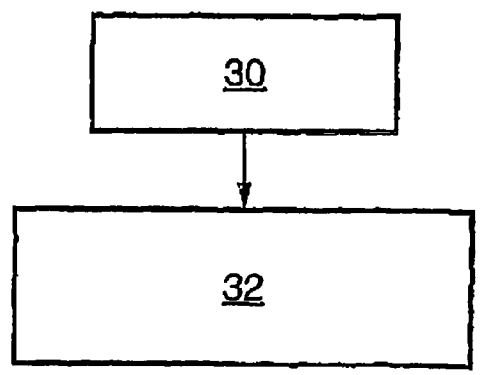
FIG. 5 is a flowchart illustrating the phase of updating of the duration of validity of the message when the terminal is shut down.

Referring now to FIG. 5, when the terminal is switched off, the presence of an SMS with positive duration of validity in the inbox is firstly checked (step 30). If such is the case, during the next step 32, an update of the duration d associated with the SMS message is effected, as previously, on the basis of the relation $d = d - n \times t$ and the instant D of the update of this duration d is time-stamped.

It will be noted that if the terminal is switched off by the user in a normal manner, all the durations of the messages with limited duration are updated and time-stamped. When the user turns on his terminal at a date D1, the duration D1−D during which the module is off will then be deducted from the duration of validity, according to the relation:

$$d = d - (D1 - D)$$

Conversely, if the terminal is shut down abruptly, for example, in the event of a supply failure, the period of time separating this shutdown from the last time-stamping will be less than the duration corresponding to the n clock cycles. In this case, the duration of validity may have been increased by this negligible time span.

Referring finally to FIG. 6, the process P4 for processing a message with elapsed duration of validity will now be described.

This process begins with a first step 34 in the course of which a check is performed to verify whether the duration of life d of the message is negative.

If such is the case, a monitoring of the value of the programming field for the behavior of the terminal indicated previously is effected.

If the value of this field is "00" (step 36), the "reply-path" field is fixed at 0 so as to validate any reply (step 38).

In this case, during the next step 40, the text of the message is replaced with the end-of-life text conveyed by the message or, by default, with a standard text.

If the field has a value of "01" (step 42), as indicated previously, the capacity of reply is not modified and the process goes directly to step 40 to effect the replacement of the initial text.

Finally, if the field has a value of "10" (step 44), the message is directly deleted (step 46).

It will be noted finally that the mode of deployment just described, according to which the duration of validity is managed within the terminal, requires management of this duration, even in the event of shutdown of the terminal or of transfer of the message. As a variant, provision could also be made for all the messages with limited duration of validity to be considered as at the end of their life on each shutdown of the terminal, or during a restart in the event of abrupt shutdown, or else upon a change of time of the terminal.

Furthermore, provision may be made for it not to be possible to transfer a message with duration of validity. This simplification is advantageous insofar as, in the event of transfer, the time spent in the network is added to the time spent on the terminal, but is, on the other hand, not counted down in the duration of validity, thus falsifying the concept of duration of validity at the level of the user, the latter being able, for example, to self-retransmit a message so as to be able to preserve it for longer.

Finally, advantageously, the local duration of validity may be associated with the parameter entitled "Validity Period" (VP) provided for in the aforesaid technical specification, which is provided so as to manage the duration for which a message can be stored in the server. In this case, the concept of duration of validity is enhanced and signifies that the message must be received by the addressee terminal before the end of the period of validity in the network and can be consulted at the terminal level only for the duration of validity d. The overall duration of validity of the message from when it is sent until its end of validity is therefore a maximum of: VP+d.

As indicated previously, the invention is not limited to the modes of implementation envisaged. Specifically, the invention applies also to the transmission of messages with limited duration of validity between two user terminals, according to a procedure similar to that described previously. Thus the duration of validity may be managed locally, at the terminal level, or in a centralized manner, at the messaging server level. On expiry of the duration of validity, the message is either deleted from the terminal or overwritten.

The mode of implementation according to which the duration of validity is managed locally involves, however, the transmission of information regarding validity simultaneously with the transmission of the message.

After detection of this information, so long as the duration of validity has not elapsed, the terminal can bring about the display of an icon or of any type of appropriate visible content to indicate the receipt of an ephemeral message and the display of the duration remaining.

In such a mode of implementation, it is also possible to provide for the displaying of a message or of an icon of end of life or of any other appropriate content in place of the message, to program or parameterize the behavior of the terminal on completion of the duration of validity.

The invention claimed is:

1. A method of managing a message with a duration of validity destined for a subscriber terminal, comprising:

elaborating information regarding the duration of validity of the message and monitoring the validity of the message based on said information, wherein, after transmitting the message, the method comprises preventing consultation of said message on expiry of the duration of validity; and storing, in a messaging services server, information identifying a type of terminal to which the subscriber terminal belongs, and identifying a mode of preventing consultation of the message to be used from among a first mode according to which the duration of validity of the message is managed within the subscriber terminal and a second mode according to which the duration of validity is managed within the messaging services server after transmission of the message to the terminal, based on the identified type of terminal.

2. The method as claimed in claim 1, further comprising transmitting the duration of validity information to the terminal jointly with the message and managing, within the terminal, the duration of storage of the message in the terminal so as to permit the consultation of the message so long as the duration has not elapsed.

3. The method as claimed in claim 2, further comprising detecting by the terminal information regarding duration of validity and generating of an acoustic symbol and/or of a visible signal for the duration of validity of the message so as to indicate the possibility of consulting the message.

4. The method as claimed in claim 2, wherein the message furthermore comprises a field for storing an expiration text and the method comprises displaying said expiration text in place of the message on the expiry of the duration of validity.

5. The method as claimed in claim 2, wherein the message furthermore comprises a field for programming the behavior of the terminal, vis-à-vis the message on expiry of the duration of validity, and the method comprises determining a mode for preventing consultation of the message between a mode of modification or of deletion of the message as a function of said programming field.

6. The method as claimed in claim 2, wherein managing the duration of validity comprises updating the duration of validity stored in a field of the message at each clock cycle of the terminal.

7. The method as claimed in claim 2, further comprising storing an instant of a last update of the duration of validity, and updating the duration of validity each time the terminal is switched on.

8. The method as claimed in claim 2, wherein said preventing the consultation of the message is performed after each shutdown of the terminal or upon each change of time of the terminal.

9. The method as claimed in claim 1, wherein said managing the duration of validity of the message is performed within a server of messaging services and wherein said preventing the consultation of the message comprises transmitting to the terminal a message replacing the message with limited duration on the expiry of the duration of validity.

10. The method according to claim 1, wherein preventing the consultation is performed by modification or suppression of said message on the expiry of the duration of validity.

11. The method according to claim 1, wherein elaborating information of duration of validity and managing the validity of the message are performed in two distinct servers and wherein the method comprises transmitting said duration of validity information between said two servers.

12. An installation for managing a message with a duration of validity destined for a subscriber terminal, comprising:
- a server of short messages;
- means for elaborating information regarding the duration of validity of the message and means for monitoring validity of the message based on said information and for preventing consultation of the message on expiry of the duration of validity of the message; and
- means for storing in a messaging services server information identifying a type of terminal to which the subscriber terminal belongs, and identifying a mode of preventing consultation of the message to be used from among a first mode according to which the duration of validity of the message is managed within the subscriber terminal and a second mode according to which the duration of validity is managed within the messaging services server after transmission of the message to the terminal, based on the identified type of terminal.

13. The installation as claimed in claim 12, wherein the means for monitoring the duration of validity of the message are hosted in the subscriber terminal for which the message is destined.

14. The installation as claimed in claim 12, wherein the means for monitoring the duration of validity of the message are hosted in a messaging services server which causes, on the expiry of the duration of validity, the transmission to the terminal of a message replacing the message with limited duration.

* * * * *